United States Patent
Park et al.

(10) Patent No.: US 7,043,272 B2
(45) Date of Patent: May 9, 2006

(54) APPARATUS FOR FORWARD BEAMFORMING USING FEEDBACK OF MULTIPATH INFORMATION AND METHOD THEREOF

(75) Inventors: Hyeong Geun Park, Taejon (KR); Hyun Seo Oh, Taejon (KR); Mun Geon Kyeong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 911 days.

(21) Appl. No.: 10/025,780

(22) Filed: Dec. 26, 2001

(65) Prior Publication Data

US 2003/0048760 A1   Mar. 13, 2003

(30) Foreign Application Priority Data

Aug. 17, 2001   (KR) ................................. 2001-49444

(51) Int. Cl.
 *H04M 1/00* (2006.01)
(52) U.S. Cl. .................... 455/562.1; 455/561; 455/63.4
(58) Field of Classification Search ............. 455/562.1, 455/517, 63.4, 561, 279.1, 269, 272, 129; 342/407, 427, 423, 429, 432–433, 437–438; 370/342, 335, 320, 328, 334, 277
See application file for complete search history.

(56) References Cited

U.S. PATENT DOCUMENTS

| | | | |
|---|---|---|---|
| 5,634,199 A | | 5/1997 | Gerlach et al. |
| 6,026,304 A | * | 2/2000 | Hilsenrath et al. ....... 455/456.2 |
| 6,031,877 A | | 2/2000 | Saunders |
| 6,101,399 A | | 8/2000 | Raleigh et al. |
| 6,108,565 A | * | 8/2000 | Scherzer ................... 455/562.1 |
| 6,122,260 A | | 9/2000 | Liu et al. |
| 6,134,261 A | | 10/2000 | Ryan |
| 6,173,014 B1 | | 1/2001 | Forssen et al. |
| 6,249,680 B1 | * | 6/2001 | Wax et al. ................ 455/456.2 |
| 6,600,445 B1 | * | 7/2003 | Li ............................... 342/368 |
| 6,847,327 B1 | * | 1/2005 | Ylitalo ........................ 342/407 |
| 2003/0048760 A1 | * | 3/2003 | Park et al. ................... 370/295 |
| 2003/0152099 A1 | * | 8/2003 | Chun et al. ................. 370/441 |
| 2003/0216156 A1 | * | 11/2003 | Chun ....................... 455/562.1 |
| 2005/0025223 A1 | * | 2/2005 | Dabak et al. ............... 375/147 |
| 2005/0136841 A1 | * | 6/2005 | Frank ........................... 455/65 |

OTHER PUBLICATIONS

Choi, et al.; Semi-blind method for transmit . . ; IEEE, VTC 2000 p. 189-194, no date listed.
Gerlach, et al.; Adaptive Transmitting . . ; IEEE Signal Processing Letters, vol. 1, No. 10, Oct. 1994, p. 150-152.

* cited by examiner

*Primary Examiner*—Sonny Trinh
(74) *Attorney, Agent, or Firm*—Mayer, Brown, Rowe & Maw LLP (57) ABSTRACT

Disclosed are an apparatus for forward beamforming using a terminal feedback and a method thereof. The base station estimates an angle of arrival (AOA) range of a user signal from reverse link received data and calculates a plurality of beamforming weights steering the estimated AOA range. Then, the base station transmits a user pilot signal by sequentially using the plurality of beamforming weights at different time areas through a control channel to estimate a forward channel conditions. A terminal calculates the user pilot signal power for all fingers at the respective time areas and feeds a time area number corresponding to the greatest power back to the base station. The base station transmits a data channel signal using a beamforming weight corresponding to the time area number fed back from the terminal.

8 Claims, 7 Drawing Sheets

APPARATUS FOR FORWARD BEAMFORMING USING FEEDBACK OF MULTIPATH INFORMATION AND METHOD THEREOF

FIELD OF THE INVENTION

The present invention relates to an apparatus for forward beamforming using a feedback of multipath information and a method thereof; and, more particularly, to an apparatus for forward beamforming using a feedback of multipath information, which is used in a frequency division duplex (FDD) code division multiple access (CDMA) base station system that uses an array antenna, and a method thereof.

DESCRIPTION OF RELATED ART

A mobile communication base station system using an array antenna increases an antenna gain with respect to a desired user to increase a maximum range, and decreases the antenna gain with respect to a user disposed at different angles to reduce an interference signal, thereby increasing a system capacity.

A typical code division multiple access (hereinafter, referred to as CDMA) system coherently adds multipath signals whose time delays are separated more than one chip, so that a performance of the CDMA system is enhanced. This is called a multipath diversity.

In case where a base station transmits the user signals through a non-directive antenna, the multipath diversity provides an optimal performance by making a terminal to collect all the multipath signals and to adds them coherently.

On the contrary, a signal power transmitted to respective multipaths can be controlled in a base station system using the array antenna. Accordingly, compared with a method for assigning an identical transmit power with respect to all the multipaths having different angles from each other and transmitting data, a method for transmitting data in a specific direction which is determined by a forward channel characteristic provides more improved performance.

However, in a mobile communication system using a frequency division duplex (hereinafter, referred to as FDD), a reverse frequency is different from a forward frequency so that there is no correlation in a channel property. Therefore, the mobile communication system using the FDD requires an additional technique for obtaining a forward channel property.

Hereinafter, three prior arts related to the additional technique will be described below.

In a first method, a base station transmits probe sequences at predetermined intervals. Then, a terminal estimates a time-varying channel characteristic by analyzing the probe sequences, and feeds back it to the base station. This method has an advantage that an accurate forward channel vector with respect to a user moving slowly can be estimated. However, there is a problem that a reverse link performance is degraded because a feedback data rate is increased in order to track a rapidly varying channel vector for a user moving fast.

One of the prior arts for reducing such a feedback data rate is disclosed in U.S. Pat. No. 5,634,199, entitled "Method of Subspace Beamforming Using Adaptive Transmitting Antennas with Feedback".

U.S. Pat. No. 5,634,199 teaches a method for obtaining forward channel information and calculating forward beamforming weights in the FDD CDMA base station system.

In U.S. Pat. No. 5,634,199, the base station transmits probe sequences, and the terminal feeds back a correlation matrix for the probe sequences to the base station. The base station calculates the forward beamforming weights using the correlation matrix fed back from respective terminals.

In this method, instead of a rapidly varying fading coefficient, the correlation matrix obtained by averaging outer products of channel vectors during a predetermined time is fed back to the base station so that a feedback data rate is reduced. However, there is a problem that a rapidly varying fading coefficient cannot be considered and so a calculated beamforming weight vector is not optimum at every time instant.

A second method is to use a fact that the reverse spatial covariance matrix is almost same as the forward spatial covariance matrix as long as the averaging time is much longer than a channel coherence time.

In general, the channel vector includes an array response vector associated with the signal directions and fading coefficients. Since the signal directions are independent from the carrier frequency, the reverse array response vector is almost the same as the forward array response vector. However, the fading coefficients have no correlation between the reverse link and the forward link.

Although this method has an advantage that the forward channel property can be estimated only with the reverse link data, a time delay becomes increased due to a long averaging time. Also, this method is difficult to be directly applied for the non-moving terminal.

In addition, since this method utilizes the average property of the channel, it cannot consider the instantaneously changing fading coefficients and so a fading reduction effect cannot be expected in the forward link.

A third method is to estimate the array response vector from the reverse link data and to obtain a forward link fading coefficients from the data fed back from the terminal. A related paper is disclosed in "Semi-Blind Method For Transmit Antenna Array In CDMA Systems", *IEEE Vehicular Technology Conference*, Fall, 2000, vol. 1, pp. 189–194, September 2000, Jinho Choi, Perreau S. and Yongup Lee.

The paper relates to methods for obtaining a forward beamforming weight vector considering the fading coefficients as well as the signal directions. The paper proposes a method for estimating the array response vector associated with the signal directions from the reverse link data and for obtaining the fading coefficients from the information fed back from the terminal. This method requires a significantly lower feedback data rate than the full feedback method(the first method), but it is based on the assumption that there is no angle spread in the channel and so cannot be directly applied for the channel with high angle spread.

SUMMARY OF THE INVENTION

It is, therefore, an object of the present invention to provide an apparatus for forward beamforming using a feedback of forward multipath information in a frequency division duplex (FDD) code division multiple access (CDMA) mobile communication system, in which an effective data communication is achieved by selecting a direction with the best channel condition among several directions using an information fed back from a terminal.

It is, therefore, another object of the present invention to provide a method for forward beamforming using a feed back of forward multipath information in a frequency division duplex (FDD) code division multiple access (CDMA) mobile communication system, in which an effective data communication is achieved by selecting a direction with the best channel condition among several directions using an information fed back from a terminal.

It is, therefore, further another object of the present invention to provide a computer-readable media for performing a method for forward beamforming using a feedback of forward multipath information in a frequency division duplex (FDD) code division multiple access (CDMA) mobile communication system, in which an effective data communication is achieved by selecting a direction with the best channel condition among several directions using an information fed back from a terminal.

In accordance with an aspect of the present invention, there is provided an apparatus for forward beamforming in a base station using an array antenna in a frequency division duplex (FDD) mobile communication system, comprising: an arrival angle range estimation means for estimating an angle of arrival(hereinafter, referred to as AOA) range of a user signal from the reverse link received data; an array receiver and demodulation means for spatial-filtering a data received through the array antenna and demodulating a data fed back from a terminal; a forward beamforming weight control means for calculating a plurality of transmission beamforming weights steering the estimated AOA range and selecting one beamforming weight steering a direction with the best forward channel condition for data channel transmission using the feedback data; and a forward beamforming and modulation means for transmitting the data channel signal using the selected beamforming weight and transmitting a user pilot signal by sequentially using the plurality of the transmission beamforming weights at different time areas.

In accordance with another aspect of the present invention, there is provided a feedback apparatus of a terminal for supporting a base station system using an array antenna to perform a forward beamforming in a frequency division duplex (FDD) communication system, comprising: a plurality of finger means for generating a data channel correlation value and a control channel correlation value; and a direction selection means for calculating a user pilot signal power for each time area and feeding a time area number corresponding to the greatest power back to the base station.

In accordance with further another aspect of the present invention, there is provided a method for forward beamforming in a base station using an array antenna in a frequency division duplex (FDD) mobile communication system, comprising the steps of: a) estimating an AOA range of a user signal from the reverse link received data; b) calculating a plurality of beamforming weights steering the estimated AOA range; c) transmitting a user pilot signal by sequentially using the plurality of beamforming weights at different time areas through a control channel to estimate a forward channel condition; d) identifying a time area number fed back from a terminal; and e) transmitting a data channel signal using a beamforming weight corresponding to the time area number fed back from the terminal.

In accordance with still further aspect of the present invention, there is provided a feedback method in a terminal supporting a base station system to perform a forward beamforming in a frequency division duplex (FDD) mobile communication system, the feedback method comprising: a) calculating a user pilot signal power for all fingers at the respective time areas; and b) feeding a time area number corresponding to the greatest value among the calculated powers back to the base station.

Additionally, in a frequency division duplex (FDD) mobile communication system, a computer-readable media storing software program instructions, the software program instructions disposed on a computer to perform a method for forward beamforming in a base station using an array antenna, comprises the steps of: a) estimating an AOA range of a user signal from the reverse link received data; b) calculating a plurality of beamforming weights steering the estimated AOA range; c) transmitting a user pilot signal by sequentially using the plurality of beamforming weights at different time areas through a control channel to estimate a forward channel condition; d) identifying a time area number fed back from a terminal; and e) transmitting a data channel signal using a beamforming weight corresponding to the time area number fed back from the terminal.

Furthermore, in a frequency division duplex (FDD), a computer-readable media storing software program instructions, the software program instructions disposed on a computer to perform a feedback method in a terminal capable of supporting a base station system to perform a forward beamforming, comprises the steps of: a) calculating a user pilot signal power for all fingers at the respective time areas; and b) feeding a time area number corresponding to the greatest value among the calculated powers back to the base station.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

In a mobile communication system using an array antenna, a propagation channel is characterized by a fading coefficient and signal direction. In the frequency division duplex (FDD) scheme, the fading coefficient has no correlation between the reverse link and the forward link due to a different carrier frequencies. However, since the signal direction is determined by a position of scatterer in an actual propagation environment, it changes relatively slowly compared with the fading coefficient and is independent of the carrier frequency.

Using these characteristics, a base station of the present invention performs a forward beamforming by using the signal directions, which are estimated from the reverse link data, and fading information with respect to respective directions, which is obtained with a terminal feedback.

Figure 1:
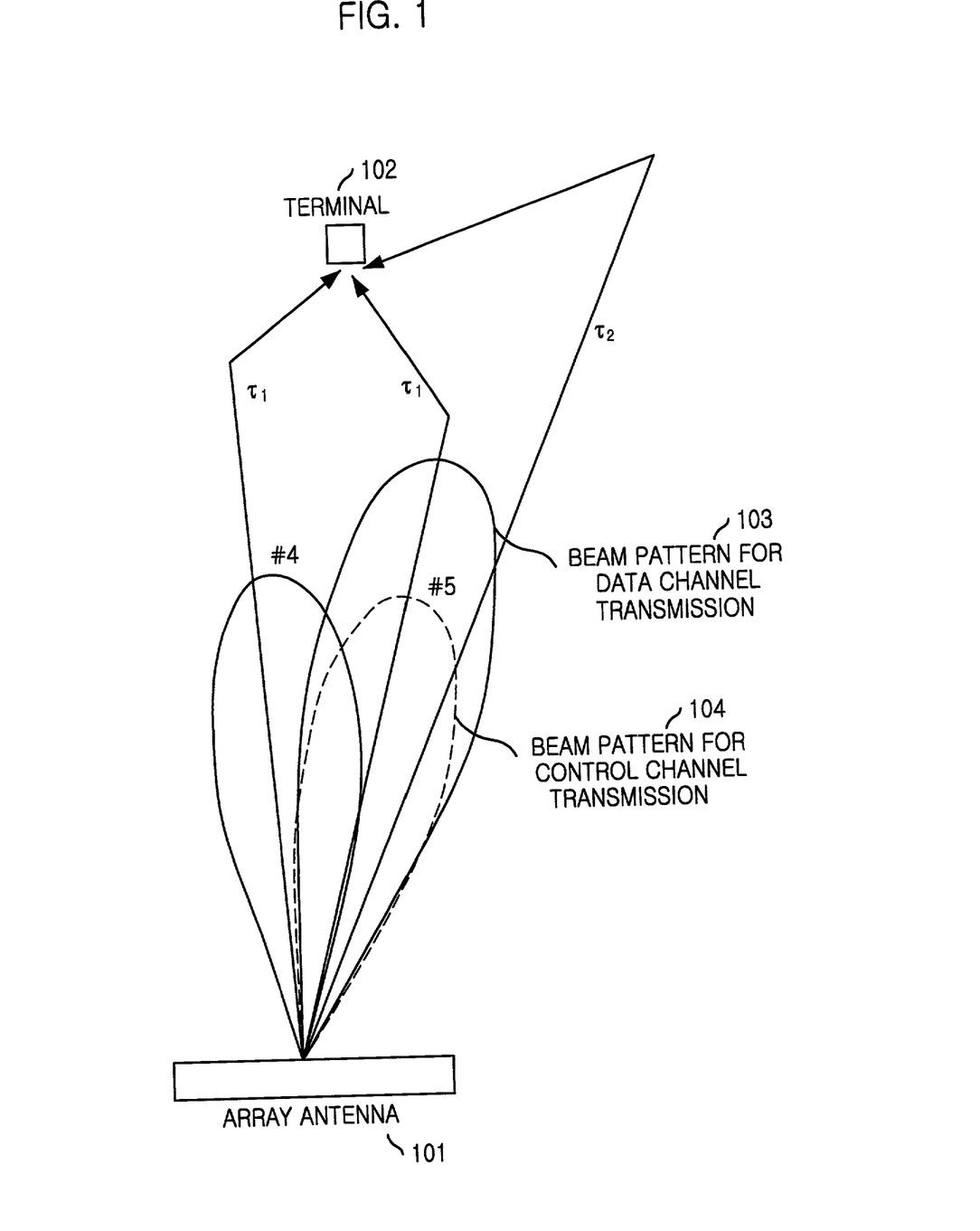
FIG. 1 is a schematic diagram explaining a method for selecting one direction among a plurality of multipath directions and transmitting a data in an adaptive array antenna base station in accordance with the present invention.

FIG. 1 is a schematic diagram explaining a method for selecting one direction among a plurality of multipath directions and transmitting a data in an adaptive array antenna base station in accordance with the present invention.

There exist two multipaths with time delay $\tau_1$ and $\tau_2$ between an array antenna 101 and a terminal 102. A base station divides a sector into a plurality of angle areas, and estimates the user signal power for each angle area.

If it is assumed that signals are detected at an angle area #4 and an angle area #5 in a channel environment of FIG. 1, the base station sequentially transmits a user pilot signal in the directions of the angle areas #4 and #5 in order to obtain a forward fading channel conditions for each angle area.

At this time, the base station transmits the user pilot signal by using a beamforming weight steering the angle area #4 at a time area 1. And then, the base station uses a beamforming weight steering the angle area #5 at a time area 2.

The terminal 102 calculates an amplitude and phase of the user pilot signal for all the detected multipaths at respective time areas, as shown in a table 1.

TABLE 1

|  | TIME AREA 1 (ANGLE AREA #4) | TIME AREA 2 (ANGLE AREA #5) |
| --- | --- | --- |
| MULTIPATH 1 ($\tau_1$) | $\alpha_{1,1}$ | $\alpha_{1,2}$ |
| MULTIPATH 2 ($\tau_2$) | $\alpha_{2,1}$ | $\alpha_{2,2}$ |

Using a following equation, the terminal 102 calculates a user pilot signal power for each time area.

$$\beta_j = \sum_i |\alpha_{i,j}|^2 \quad \text{(Eq. 1)}$$

where, $\beta_j$ represents a user pilot signal power at j-th time area, and $\alpha_{i,j}$ represents a complex channel value for i-th multipath at j-th time area.

Comparing a user pilot signal power at a first time area, $\beta_1$ with a user pilot signal power at a second time area, $\beta_2$, the terminal 102 feeds a time area number corresponding to the greater power back to the base station.

The base station transmits a data channel signal using a beamforming weight steering the angle area corresponding to the time area number fed back from the terminal 102.

As stated above, since the terminal 102 feeds back only the time area number to the base station, an amount of feedback data can be reduced. Also, instead of transmitting a data channel signal through an antenna beam covering two angle areas simultaneously, the base station selects one angle area with a better channel condition and then transmits a data channel signal toward only the selected angle area, so that, compared with a method of using a broad antenna beam covering the two angle areas, a transmission antenna gain is relatively increased due to the narrower beamwidth and interferences to other users can also be reduced.

Additionally, an apparatus for forward beamforming using a feedback of multipath information can obtain a diversity effect by changing the data channel transmission direction according to the forward channel condition. That is, in case where it is assumed that there is no multipath corresponding to $\tau_2$ in FIG. 1, if the base station switches the transmit direction among the two angle areas #4 and #5 according to the terminal feedback, the fading effect can be reduced although one time-resolvable multipath is present.

Figure 2:
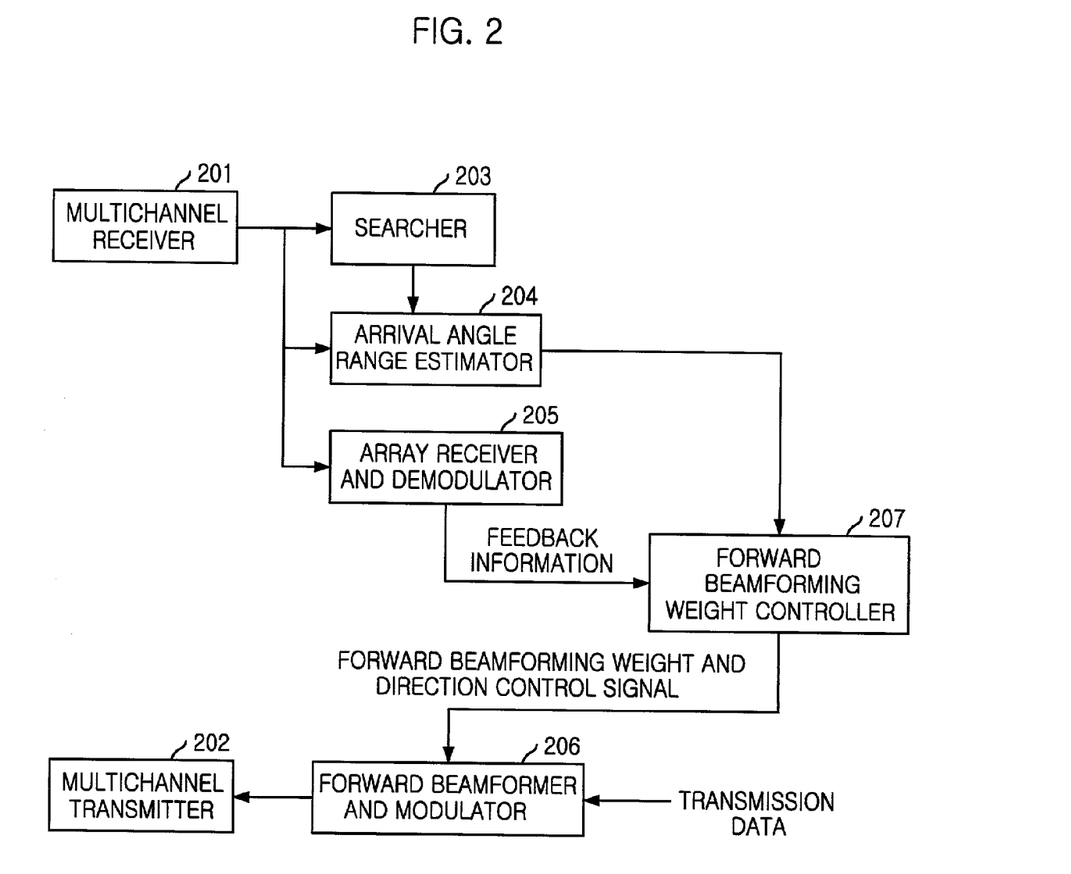
FIG. 2 is a block diagram illustrating an apparatus for forward beamforming of an adaptive array antenna base station in accordance with the present invention.

FIG. 2 is a block diagram illustrating an apparatus for forward beamforming of an adaptive array antenna base station in accordance with the present invention.

Referring to FIG. 2, the apparatus for forward beamforming of the adaptive array antenna base station includes a multichannel receiver 201, a multichannel transmitter 202, a searcher 203, an arrival angle range estimator 204, an array receiver and demodulator 205, a forward beamformer and modulator 206, and a forward beamforming weight controller 207.

In the multichannel receiver 201, a data received through an array antenna is down-converted to a baseband and then digitized.

The searcher 203 detects the multipaths.

The arrival angle range estimator 204 divides a sector into a plurality of angle areas and estimates a signal AOA range. The signal AOA range is estimated by measuring the received signal power for the respective angle areas and comparing the measured power with a predetermined threshold value. The estimated AOA range is transferred to the forward beamforming weight controller 207.

The array receiver and demodulator 205 spatially filters the digital data received from the multichannel receiver 201 and identifies a feedback data.

The forward beamforming weight controller 207 stores the calculated transmission beamforming weights, which steer the corresponding angle areas divided by the arrival angle range estimator 204, and transfers the beamforming weights steering the estimated AOA range to the forward beamformer and modulator 206.

Also, based on the terminal feedback information transferred from the array receiver and demodulator 205, the forward beamforming weight controller 207 selects one beamforming weight for data channel signal transmission.

The forward beamformer and modulator 206 transmits a user pilot signal by sequentially using a plurality of beamforming weights steering the estimated AOA range at different time areas, and transmits the data channel signal using the selected beamforming weight.

Figure 3:
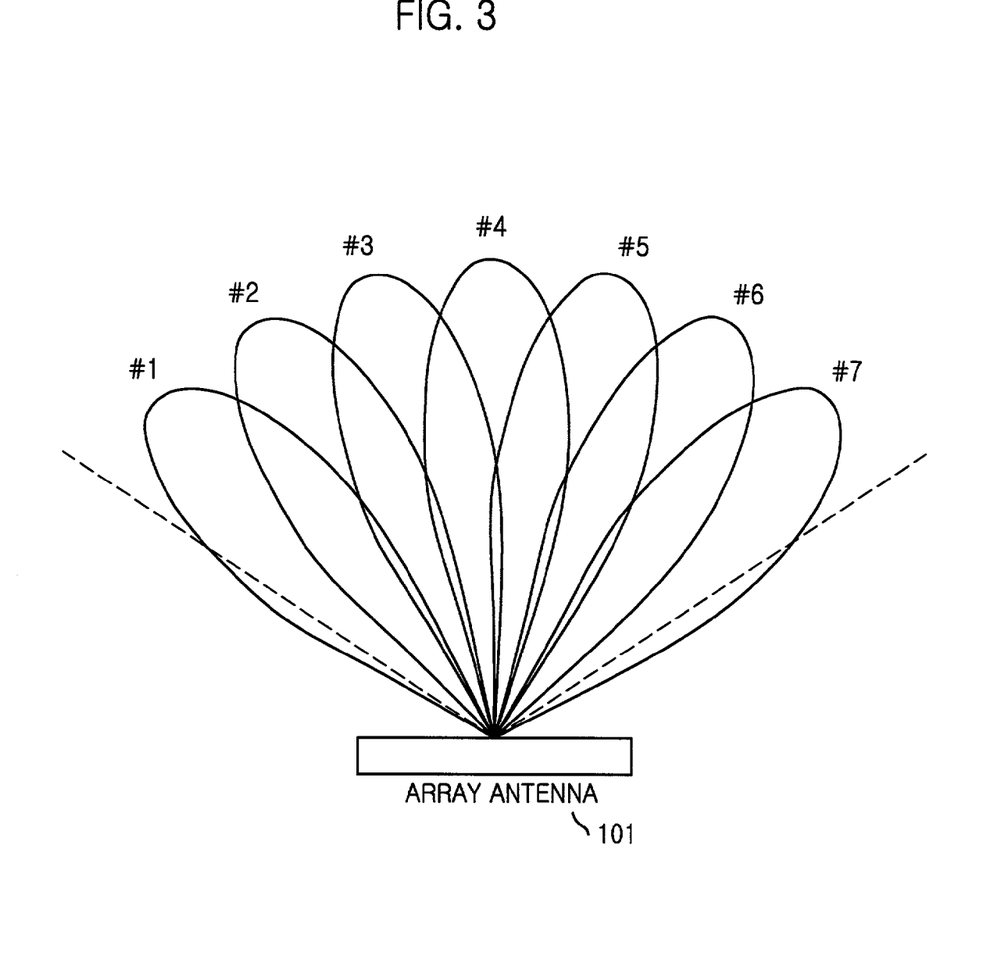
FIG. 3 is a beam pattern used to explain a method for estimating a signal AOA range by using a reverse link received data in accordance with the present invention.

FIG. 3 is a beam pattern used to explain a method for estimating a signal AOA range by using a reverse link received data in accordance with the present invention.

As shown, the base station divides a sector into seven angle areas, and designates an angle area in which the user signal power is greater than a threshold value as a signal AOA range.

At this time, the signal power received through the angle area can be calculated by averaging a power of an inner product of the beamforming weight steering the corresponding angle area and an array response vector of the user signal, as expressed in a following equation.

$$\lambda_{m,n} = E\{|w_{r,m}^H r_{xd,n}|^2\} \quad \text{(Eq. 2)}$$

where, $\lambda_{m,n}$ represents the power of a n-th multipath component of the user signal received through the m-th angle area, $w_{r,m}$ is a column vector representing a beamforming weight steering the m-th angle area, and $r_{xd,n}$ represents an array response vector of the n-th multipath component of the user signal, and is estimated as follows:

$$r_{xd,n} = E\{xd_n\}$$

where, x is a received snapshot vector, and $d_n$ is a reference signal correlated with the n-th multipath component of the user signal.

Figure 4:
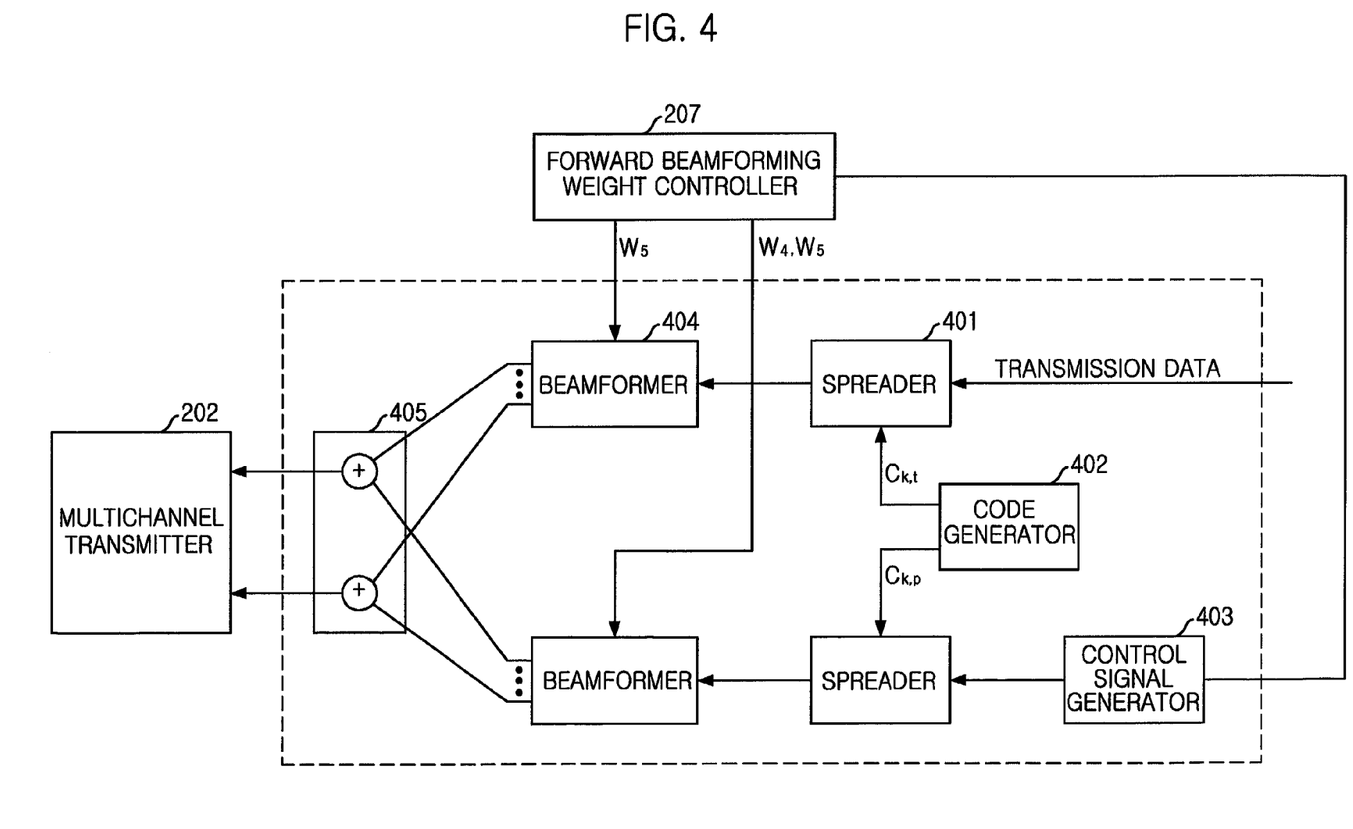
FIG. 4 is a block diagram illustrating a forward beamformer and modulator of an adaptive array antenna base station in accordance with the present invention.

FIG. 4 is a block diagram illustrating a forward beamformer and modulator of an adaptive array antenna base station in accordance with the present invention.

Referring to FIG. 4, the forward beamformer and modulator includes a spreader 401, a code generator 402, a control signal generator 403, a beamformer 404 and a vector adder 405.

The control signal generator 403 generates a control channel bit and a time area number, which is to be used for a data channel transmission.

The code generator 402 generates a data channel code $C_{k,t}$ and a control channel code $C_{k,p}$ for the k-th user.

The spreader 401 multiplies a transmission data and a control signal by the data channel code $C_{k,t}$ and the control channel code $C_{k,p}$, respectively.

As shown, a data channel beamformer 404 generates a data channel signal vector by multiplying a data channel signal by a beamforming weight steering the angle area selected for data channel transmission. And, a control channel beamformer generates a control channel signal vector by multiplying a control channel signal by a plurality of beamforming weights steering the estimated AOA range.

For example, in case where it is assumed that there is no multipath corresponding to $\tau_2$ in FIG. 1, the data channel transmission is achieved using either $w_4$ or $w_5$, and the control channel transmission is achieved by sequentially using $w_4$ and $w_5$ at different time areas.

The vector adder 405 adds the data channel signal vector and the control channel signal vector.

Figure 5:
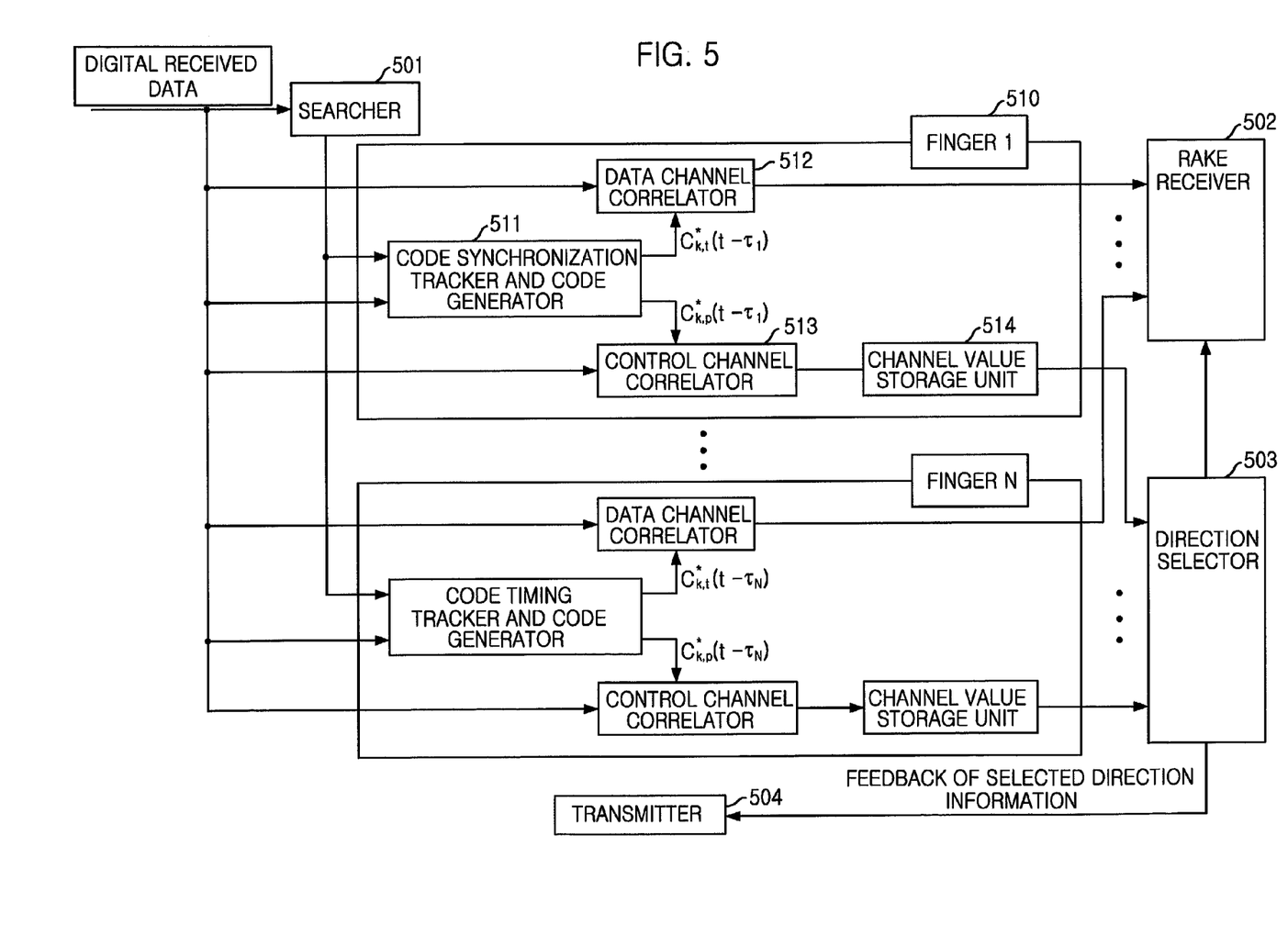
FIG. 5 is a block diagram illustrating a feedback device of a terminal, which supports a base station to perform a forward beamforming.

FIG. 5 is a block diagram illustrating a feedback device of a terminal, which supports a base station to perform a forward beamforming.

Referring to FIG. 5, the terminal of the present invention includes a searcher 501, a rake receiver 502, a direction selector 503, a transmitter 504 and a plurality of fingers 510.

Also, the finger 510 includes a code timing tracker and code generator 511, a data channel correlator 512, a control channel correlator 513 and a channel value storage unit 514.

The searcher 501 detects forward multipaths and transfers code timing information of the detected multipath to the code timing tracker and code generator 511.

And, the code timing tracker and code generator 511 also generates a data channel code $C^*_{k,t}(t-\tau_i)$ and a control channel code $C^*_{k,p}(t-\tau_i)$, whose timings are adjusted for the i-th multipath signal with time delay, $\tau_i$.

The data channel correlator 512 and the control channel correlator 513 correlates a digital received data with the data channel code $C^*_{k,t}(t-\tau_i)$ and the control channel code $C^*_{k,p}(t-\tau_i)$, respectively. A control channel signal is constituted with a user pilot and a time area number. The time area number and the user pilot are located at different time areas.

The channel value storage unit 514 stores the channel value for the respective time areas. The channel value is estimated by analyzing the user pilot signal contained in the control channel.

The direction selector 503 calculates the user pilot signal power for each time area, as expressed in the equation 1, and feeds a time area number with the greatest power back to the base station.

Also, the direction selector 503 demodulates the control channel and identifies a time area number that the base station sent to notify a terminal which direction was selected for the data channel transmission.

The rake receiver 502 coherently demodulates the data channel signal using the channel values corresponding to the received time area number.

Figure 6:
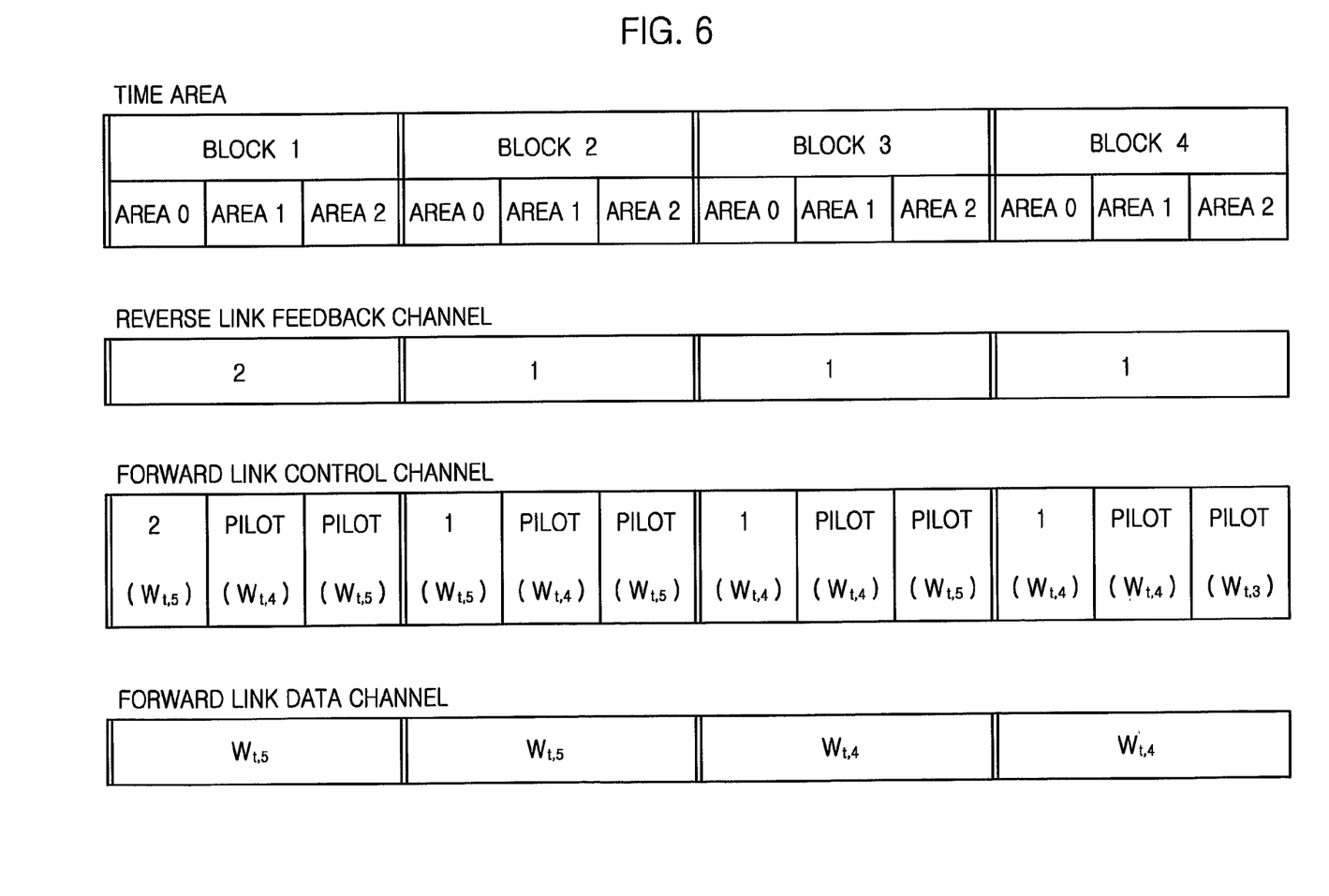
FIG. 6 is a block diagram illustrating the data formats of the control channel and data channel of an adaptive array antenna base station in accordance with the present invention.

FIG. 6 is an exemplary block diagram illustrating forward control channel and data channel formats in accordance with the present invention under the channel environment shown in FIG. 1.

The control channel is constituted with a plurality of blocks, and each block is divided into three time areas. At a time area 0 of each block, a time area number corresponding to a beamforming weight for transmitting a data channel at next block is included. The time area number is transmitted by a beamforming weight used for the data channel transmission at that block.

At time areas 0 and 1, the user pilot signal is transmitted using $w_{t,4}$ and $w_{t,5}$. A time area number with the greatest user pilot signal power is fed back to the base station by the terminal via a reverse link feedback channel.

At a block 1, since the user pilot signal power for the time area 2 is greatest, the data channel is transmitted using $w_{t,5}$.

At a block 2, since '1' is received through a reverse link feedback channel, and it is known that the user pilot signal power for the time area 1 is greatest. Accordingly, by transmitting '1' at the time area 0 of the block 2, the base station in advance indicates to the terminal that a data channel is to be transmitted at a next block using a beamforming weight $W_{t,4}$ corresponding to the time area 1.

At the block 2, since the terminal is not ready to receive the data channel signal transmitted by the beamforming weight $w_{t,4}$ the base station transmits the data channel signal using $W_{t,5}$ which has been used at the previous block.

At a block 3, the base station transmits the data channel signal using $w_{t,4}$.

At a block 4, the base station identifies from the reverse link received data that a user signal power for the angle area #3 is greater than that for the angle area #5. In order to obtain a forward channel characteristic of the angle area 3, the base station transmits the user pilot signal using $w_{t,3}$ at the time area #2. The data channel is transmitted using $w_{t,4}$ just as at the block 3.

Figure 7:
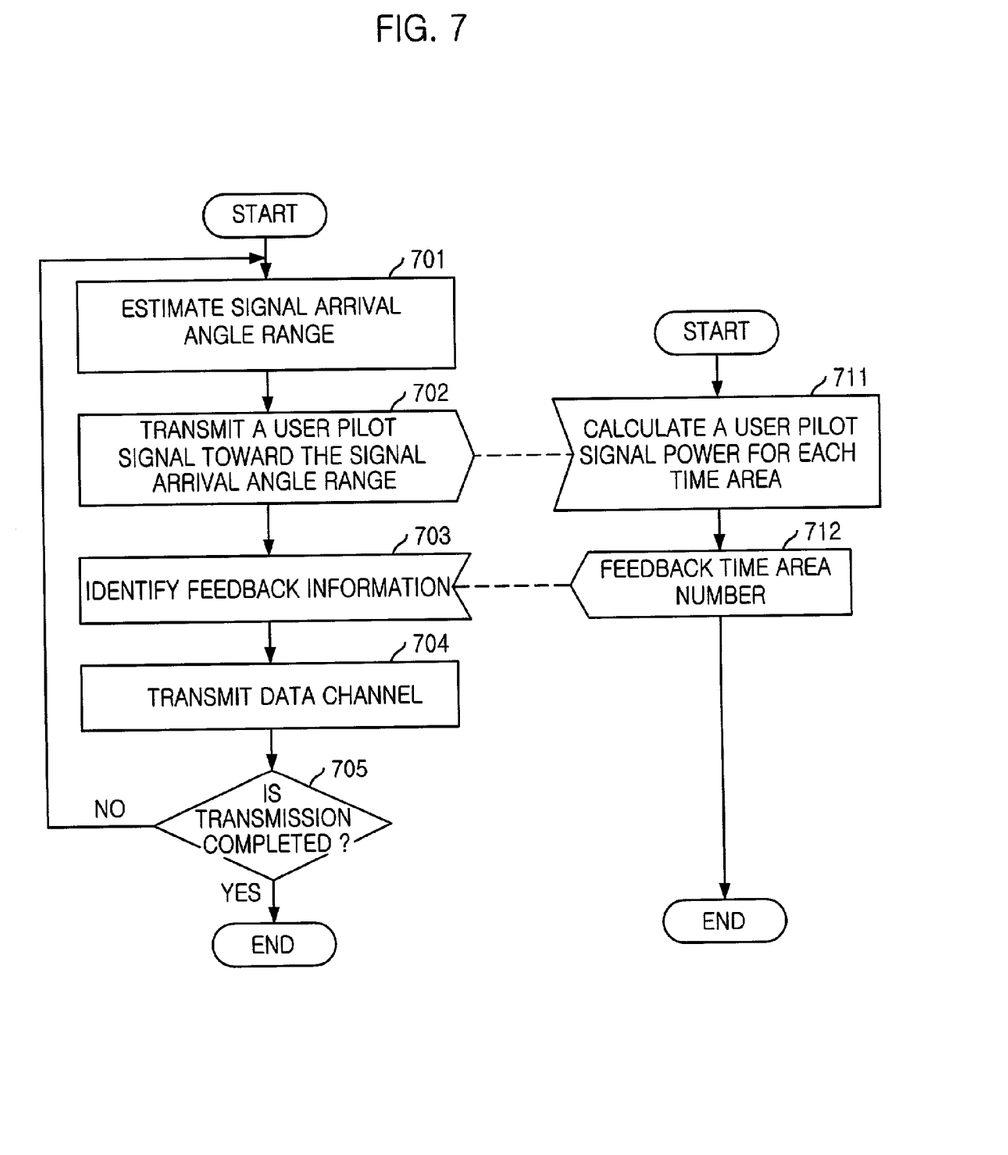
FIG. 7 is a flowchart illustrating a method for forward beamforming using a feedback of multipath information in accordance with the present invention.

FIG. 7 is a flowchart illustrating a method for forward beamforming using a feedback of multipath information in accordance with the present invention.

Referring to FIG. 7, at step 701, a base station sector is divided into a plurality of angle areas, and the power of the user signals received through respective angle areas are calculated and compared with a predetermined threshold to be used for estimating the signal AOA range.

At step 702, the base station transmits a user pilot signal by sequentially using the beamforming weights steering the estimated AOA range at different time areas.

At steps 711 and 712, the terminal calculates a user pilot signal power for each time area and feeds a time area number corresponding to the greatest power back to the base station.

At steps 703 and 704, the base station identifies the time area number fed back from the terminal, and transmits the data channel signal using a beamforming weight corresponding to that time area number.

The method in accordance with the present invention can be stored in a computer-readable media, which is implemented with a program, such as CDROM, RAM, ROM, floppy disk, hard disk, magneto-optical disk, and the like.

As mentioned above, the base station calculates the signal AOA range from the reverse link received data and only the time area number with the best channel condition is fed back from the terminal, thereby reducing a the feedback data rate significantly.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a frequency division duplex (FDD) mobile communication system, an apparatus for forward beamforming in a base station using an array antenna, comprising:
    an arrival angle range estimation means for estimating an angle of arrival (AOA) range of a user signal from a reverse link received data and generating an estimated AOA range;
    an array receiver and demodulation means for spatial-filtering a data received through the array antenna and demodulating a data fed back from a terminal;
    a forward beamforming weight control means for calculating a plurality of transmission beamforming weights steering the estimated AOA range and selecting one beamforming weight steering a direction with a best forward channel condition for data channel transmission using the feedback data; and
    a forward beamforming and modulation means for transmitting the data channel signal using the selected beamforming weight and transmitting a user pilot signal by sequentially using the plurality of the transmission beamforming weights at different time areas.

2. The apparatus as recited in claim 1, wherein the arrival angle range estimation means divides a base station sector into a plurality of angle areas, calculates the signal powers for the respective angle areas, and designates the angle area for which the signal power is greater than a threshold value as the AOA range.

3. The apparatus as recited in claim 2, wherein the arrival angle range estimation means calculates the user signal power for each angle area by averaging a power of an inner product of the beamforming weight steering the corresponding angle area and an array response vector of the user signal expressed by an equation as:

$$\lambda_{m,n} = E\{|w_{r,m}^H r_{xd,n}|^2\}$$

where, $\lambda_{m,n}$ represents the power of a n-th multipath component of the user signal received through the m-th angle area,
$w_{r,m}$ is a column vector representing a beamforming weight steering the m-th angle area, and
$r_{xd,n}$ represents an array response vector of the n-th multipath component of the user signal, and is estimated by an equation expressed as:

$$r_{xd,n} = E\{xd_n\}$$

where, x is a received snapshot vector, and
$d_n$ is a reference signal correlated with the n-th multipath component of the user signal.

4. The apparatus as recited in claim 1, wherein the forward beamforming and modulation means includes:
    a control signal generation unit for generating a user-specific pilot bit;
    a code generation unit for generating a data channel code and a control channel code;
    a data channel spreading unit for multiplying a transmit data by a data channel code to generate a data channel signal;
    a control channel spreading unit for multiplying a control signal bit received from the control signal generation unit by a control channel code to generate the control channel signal;
    a data channel beamforming unit for multiplying the beamforming weight selected for data channel transmission by the data channel signal to generate a data channel signal vector;
    a control channel beamforming unit for sequentially multiplying the plurality of beamforming weights steering the estimated angle range by the control channel signal at different time areas, to thereby generate a control channel signal vector; and
    a vector addition unit for adding the data channel signal vector and the control channel signal vector.

5. In a frequency division duplex (FDD) mobile communication system, a method for forward beamforming in a base station using an array antenna, comprising the steps of:
    a) estimating an angle of arrival (AOA) range of a user signal from reverse link received data, thereby generating an estimated AOA range;
    b) calculating a plurality of beamforming weights steering the estimated AOA range;
    c) transmitting a user pilot signal by sequentially using the plurality of beamforming weights at different time areas through a control channel to estimate a forward channel condition,
    d) identifying a time area number fed back from a terminal; and
    e) transmitting a data channel signal using a beamforming weight corresponding to the time area number fed back from the terminal.

6. The method as recited in claim 5, wherein, in the step a), the user signal AOA range is estimated by dividing a base station sector into a plurality of angle areas, calculating the signal powers for the respective angle areas, and designating the angle area for which the signal power is greater than a threshold value as the AOA range.

7. The method as recited in claim 5, wherein, in the step b), the control channel includes a user pilot signal and a time area number, wherein the time area number corresponds to the beamforming weight to be used for the data channel transmission at a next block.

8. In a frequency division duplex (FDD) mobile communication system, a computer-readable recording media storing software program instructions for executing a method for forward beamforming in a base station using an array antenna, the method comprising the steps of:
    a) estimating an angle of arrival (AOA) range of a user signal from reverse link received data, thereby generating an estimated AOA range;
    b) calculating a plurality of beamforming weights steering the estimated AOA range;
    c) transmitting a user pilot signal by sequentially using the plurality of beamforming weights at different time areas through a control channel to estimate a forward channel condition;
    d) identifying a time area number fed back from a terminal; and
    e) transmitting a data channel signal using a beamforming weight corresponding to the time area number fed back from the terminal.

* * * * *